United States Patent [19]

O'Malley

[11] 3,860,484
[45] Jan. 14, 1975

[54] ENZYME STABILIZATION
[75] Inventor: James Joseph O'Malley, Webster, N.Y.
[73] Assignee: Xerox Corporation, Stamford, Conn.
[22] Filed: Sept. 28, 1972
[21] Appl. No.: 293,255

[52] U.S. Cl. .................................. 195/63, 195/68
[51] Int. Cl. .............................................. C07g 7/02
[58] Field of Search .................................. 195/63, 68

[56] References Cited
UNITED STATES PATENTS

| | | | |
|---|---|---|---|
| 3,371,019 | 2/1968 | Hammer et al. | 195/63 X |
| 3,539,453 | 11/1970 | Deutsch | 195/63 |
| 3,546,074 | 12/1970 | Deutsch | 195/63 X |
| 3,634,258 | 1/1972 | Wildi et al. | 195/68 X |

Primary Examiner—David M. Naff

[57] ABSTRACT

The bio-catalytic activity of oxidoreductase enzymes is stabilized by contacting the enzymes in solution with stabilizing synthetic polymers selected from polyvinyl pyrrolidone, polyethylene oxide, copolymers of polyvinyl pyrrolidone and polyvinyl acetate, and copolymers of polyvinyl alcohol and polyvinyl acetate to form an aqueous composition containing the enzyme and polymer. The aqueous composition can be converted to a dry form by freeze drying.

8 Claims, No Drawings

ENZYME STABILIZATION

This invention relates to the use of enzymes. More particularly, this invention relates to the stabilization or protection of enzymes by stabilizing their bio-catalytic activity.

An enzyme is a protein with catalytic properties due to its power of specific activation. The characteristic property of enzymes is their power of catalyzing certain definite chemical reactions. Except for a few enzymes which can be detected by direct spectroscopic techniques or other observations, they are usually detected by the occurrence of the specific reactions which they catalyze; the amount of enzyme present is estimated from the reaction velocity.

Because enzymes are extremely efficient biological catalysts, much interest has evolved surrounding their activity which is believed to result from a well-defined three dimensional structure and their chemical compositions which can be generally characterized as a chain or sequence of amino acids. To study enzymes as well as to use them in many applications, it is necessary to remove them from their natural environment and isolate them for use or storage. It is well-known that these materials are fragile substances having a tendency to undergo conformational changes, denaturation, and inactivation under unsuitable conditions. In removing them from their natural environment and in their handling, the first consideration must always be to avoid inactivation. Comparatively violent treatments (strong acids, high temperatures, powerful reagents, etc.) frequently used in organic chemistry are instantly fatal and the treatments to which they can be subject are severely limited by their instability.

Success in dealing with enzymes depends upon the avoidance of conditions in which they are unstable and such conditions vary with different enzymes; but in general, high temperature environments are to be avoided with all enzyme materials. It is advisable as far as possible not to expose enzymes to temperatures above body temperature, and many enzyme treatments are entirely carried out at about 0°C. as a matter of course.

In most cases there is an inactivation of enzyme on standing, even under the most favorable conditions; thus it has been generally considered advisable when possible to prepare and use enzyme solution within a short time period.

The storing of enzymes without loss of activity is also a problem for similar reasons. When an enzyme solution can be frozen and thawed without loss of activity, it is most convenient to simply keep them in the deep freeze where sometimes them may be kept stable for from a few weeks to several months. However, it is obvious that such a procedure has many difficulties and is less satisfactory then often desired. Drying of enzymes has also been used but here also problems occur and shelf-life stability is not uniform.

Enzyme materials have many varied and practical uses. They are used for detecting and measuring the presence of certain components in a biological sample. In clinical diagnosis of certain pathological conditions, it is frequently valuable to know the amount of activity or the quantity of certain substances present in a specimen of a biological or other fluid, or tissue. One of the more effective means that has been used for making assays of such specimens is to provide a reagent which contains one or more biological components. Now when a given reagent is mixed with the specimen, the components are effective to cause an enzymatic reaction that involves the unknown substance. By observing the reaction and evaluating it, it is possible to determine the quantity or amount of activity of the unknown originally present.

Because such reagents employed contain one or even more biological components such as enzymes, coenzymes, and/or substrates, the reagent is usually and inherently very unstable as discussed above, and has very little if any shelf-life. Thus to insure the reagent being at optimum strength, it generally must be prepared at or immediately prior to the time the assay is made. In addition the biological components themselves are very unstable due to the absence of a natural environment as discussed above and thus it is also occasionally necessary to stabilize these components by themselves in some form. Often this may be done through concentrating the protein.

Accordingly, it is an object of this invention to provide for the stabilization of biological elements. It is another object of this invention to provide for the stabilization of the biocatalytic activity of enzyme materials. It is yet another object of this invention to provide for a stabilized enzymatic composition. These and other objects and advantages will become apparent from a full and complete reading of the following specification.

It has been uniquely found that sensitive enzymes may be stabilized in their bio-catalytic activity by preparing the same in the presence of stabilizing synthetic polymers. The stability of these bio-catalytical materials is substantially enhanced by placing them in intimate association with the stabilizing polymers, and this can be accomplished by both preparing the enzyme in solution and in a dry form in the presence of the stabilizing material.

It has been found that heat sensitive enzymes may be thermally stabilized by the processes of this invention. Enzymes of the oxidoreductase class which are used for biological oxidation and reduction, and with respiration and the fermentation process may be stabilized by the processes of this invention. This class includes not only dehydrogenases and oxidases, but also the peroxidases, the hydroxylases, and the oxygenases. A particularly representative enzyme of this whole group is glucose oxidase which is an oxidase enzyme of fungal origin.

Stabilization occurs by the intimate association of sensitive enzymes, particularly enzymes of the above class with synthetic polymers and copolymers selected from groups consisting of polyvinyl pyrrolidone, polyethylene oxide, polyacrylamide, copolymers of polyvinyl pyrrolidone and polyvinyl acetate, and copolymers of polyvinyl alcohol and polyvinyl acetate. Any of the above polymers or mixtures thereof may be used in the process of this invention. It is unique that the molecular weight of the polymer has little or no demonstrated effect on the stabilization properties imparted and it is also unique that the weight ratio of polymer to enzyme in the intimate association provided for by this invention is not critical to the effectiveness of the invention. Generally speaking, it has been found that the invention is effective for the stabilization of the bio-catalytic activity of enzymes when the weight ratio of polymer to enzyme in intimate association is from about 5 to 1 to about 50,000 to 1. A preferred and convenient weight ratio of polymer of enzyme is about $5 \times 10^3$ to 1. The weight ratio of polymer to enzyme is found significant only to the extent that if it is desired to stabilize the enzyme either in solid or aqueous form to extremely high temperatures, that is, temperatures above about 100°C. which are clearly extraordinary in normal enzyme operations; it may be found desirable to use higher ratios of polymer to the enzyme material.

In one of the processes contemplated, one or more of the stabilizing polymer materials of the class described above is completely dissolved or uniformly dispersed throughout an aqueous mixture of the enzyme material for stabilizing it. It has been found that by adding the stabilizers to the solution, the activity of the enzyme is substantially maintained. More significantly, however, the thermal stability of the enzyme is significantly improved in that the solution may be kept for reasonable periods of time without suffering from an adverse decline in bio-catalytic activity and this is true even at higher temperatures which would cause the enzyme alone to deteriorate to little or no activity whatsoever.

Using enzyme solutions in intimate association with the stabilizer of the invention, in the event it is desired to decrease the activity of the solution, the solution itself may be diluted by adding water. If it is desired to concentrate or increase the amount of activity of this enzyme solution, a portion of the liquid may be removed by conventional techniques in this art such as for example evaporation, while the solution is maintained at reasonable temperatures. It may thus be seen that a stable enzyme solution is provided and that the stability of the solution is independent of the concentration of the enzyme and exhibits stability over a wider range of bio-catalytic activities than has been previously possible.

While the above described stabilizing enzyme solution may be used for certain purposes under some circumstances, it is generally desirable to have the enzyme biological material in the form of a dry mixture. This may be accomplished by freeze-drying this solution. Freeze-drying techniques for enzyme materials themselves are known, but unfortunately suffer from a disadvantage in that the very step of freeze-drying causes a substantial reduction in the bio-catalytic activity of the enzyme. It has been found that by utilizing the stabilizers of this invention for the freeze-drying technique, the loss in activity of enzymatic materials during the freeze-drying process can be substantially reduced. Moreover, it has been found that by employing the stabilizers of this invention in intimate association with the enzyme following the freeze-drying step, an active material is provided having an increase in thermal stability. Thus, this invention gives longer shelf-life and provides for more uniform results under varying climatic and storage conditions.

In freeze-drying, an aqueous solution of polymer and enzymatic materials to be stabilized is frozen to provide a solid mass and then placed under a vacuum. The vacuum is of sufficient magnitude to cause the frozen liquid to sublimate and the frozen mass is kept under this vacuum for a period of time sufficient to insure the removal of all water leaving behind a solid residue that contains the enzyme in intimate relationship with the stabilizer. Generally in this process the liquid solution is frozen by any conventional technique, such as, for example, by placing the solution in a 2-propanol-dry ice bath or other convenient means and then high vacuum sufficient to remove the water, such as, for example, a vacuum value of $10^{-3}$ mm mercury may be employed. Generally a period of from 1 to 10 hours is sufficient to remove the water. The result of this process is that the stabilizers are effective in preserving the activity of the enzyme for an extended period of time even though the enzyme is in the form of a solid.

The term "stabilize" as used herein broadly relates to the prevention of change or destruction of the active component. By "intimate association", it is meant that the enzyme and stabilizer are sufficiently associated physically or chemically in nature so that the enzyme material is protected in accordance with the invention.

In the freeze-drying process, the residues which are solid will sometimes be in a fluffy, flakey, or powder condition. However, if it is desired, the residue, that is the enzyme and its stabilizer may be ground until it is reduced to a finely powdered mixture. The fact that the powder mixture is substantially dry contributes in part to the chemical stability of the enzyme, but the presence of the stabilizers of this invention contributes to the thermal stability as well as the chemical stability of the material.

The stabilized enzymes or enzymatic compositions of this invention may be used in any conventional manner with or without further treatments and this also is an additional advantage of this invention.

While the invention has been broadly described above, the following non-limiting examples are given to further demonstrate the advantages and principles of this invention. All parts are by weight unless otherwise stated.

The standard testing reagent was a combination of 12.6 mg/ml ortho-dianisidine dihydrochloride, ten percent by weight dextrose solution, one mg/ml horseradish peroxidase, and 0.1 molar phosphate buffer having a pH of 6.8. The assay solution was 34 ml of dionized water, 1 ml of the ortho-dianisidine dihydrochloride, 5 ml of dextrose solution, 5 ml of the horseradish peroxidase, and 5 ml of phosphate buffer.

EXAMPLE I

The enzyme glucose oxidase, (EC 1.1.3.4) an oxygen oxidoreductase, was obtained from Boehringer-Mannheim Corporation. The enzyme form was a purified, dry powder having a good degree of purity and a specific activity of approximately 20 U/mg. Stock solutions of the enzyme were prepared as required by mixing the enzyme with deionized water at room temperature so that the final concentration of enzyme was 0.02 mg/cc.

Polyethylene oxide polymer having a molecular weight of about 20,000 was admixed with deionized water at room temperature so that the final concentration of polymer was one gram per 100 cc. One part of glucose oxidase stock solution was well mixed with ten parts polyethylene oxide polymer solution and this mixture was placed in a freeze-drying flask and cooled to about minus 80°C. in a 2-Propanol-Dry ice bath for approximately 1 minute. The sample was then vacuum evaporated at $10^{-3}$ mmHg. for 4 hours and then the dry mixture of polymer and enzyme was removed from the flask under a nitrogen blanket and placed in a clean stoppered tube.

This procedure was simultaneously run in every detail except that the addition of polymer was omitted.

These two enzyme compositions were immediately tested for activity by mixing identical amounts of the samples in water, adding the standard testing reagent for glucose oxidase, and at the end of exactly 5 minutes, 5N hydrochloric acid was added and mixed with the samples. Each sample was read in the Gilford 2,400 Spectrophotometer at 400 nm to determine the activity of the enzyme remaining prior to the addition of acid.

By using a control to determine the activity of the pure untreated enzyme in absolute units and taking this value to be as 100 percent, the freeze-dried enzyme had 42 percent of its activity remaining while the freeze-dried enzyme with polyethylene oxide had 75 percent of its activity remaining. This demonstrates the beneficial effect that polymers have for stabilizing enzymes during the freeze-dry process.

EXAMPLE II

The enzyme glucose oxidase used in Example I was prepared by the freeze-dry process of Example I with the following polymers:

polyvinyl pyrrolidone having a molecular weight of 28,000
polyvinyl pyrrolidone having a molecular weight of 180,000.

Both samples were prepared, processed, and tested in the identical fashion to Example I. In both cases the enzyme had approximately 86 percent of its activity remaining after the freeze-dry process, thus demonstrating that molecular weight is not a factor in stabilizing the enzyme using the techniques of this invention.

EXAMPLE III

The enzyme glucose oxidase used in Example I was prepared by the freeze-dry process of Example I following the identical procedures for preparation, processing, and testing both by itself and with the following polymers and copolymers:

polyvinyl pyrrolidone having a molecular weight of 28,000
a copolymer of polyvinyl pyrrolidone and polyvinyl acetate having a high molecular weight and containing 50 mole percent polyvinyl acetate
a copolymer of polyvinyl alcohol and polyvinyl acetate having a molecular weight of 12,000 and containing 12 mole percent polyvinyl acetate.

As stated above the procedures of Example I were repeated in every detail except that following the freeze-dry step, the samples were heat aged at 60°C. Over a period of 71 hours, select samples were removed and tested for activity remaining. The results are tabled below. The symbol for time shown as B indicates the activity of the enzyme or the enzyme with the polymer before freeze-dry processing while the time O indicates the activity immediately after freeze-drying.

| | Time (hours) | Activity Remaining (%) |
|---|---|---|
| Enzyme Alone | B | 100 |
| | 0 | 42 |
| | 4 | 18 |
| | 20 | 10 |
| | 28 | 4 |
| | 52 | 6 |
| | 70 | 7 |
| Enzyme with polyvinyl | B | 95 |

-Continued

| | Time (hours) | Activity Remaining (%) |
|---|---|---|
| pyrrolidone | 0 | 86 |
| | 2 | 82 |
| | 5 | 80 |
| | 29 | 70 |
| | 53 | 34 |
| | 68 | 22 |
| Enzyme with a copolymer of polyvinyl pyrrolidone and polyvinyl acetate | B | 100 |
| | 0 | 93 |
| | 1 | 73 |
| | 4 | 51 |
| | 20 | 49 |
| | 28 | 45 |
| | 49 | 42 |
| Enzyme with a copolymer of polyvinyl alcohol and polyvinyl acetate | B | 102 |
| | 0 | 103 |
| | 3 | 55 |
| | 19 | 46 |
| | 27 | 42 |
| | 51 | 27 |
| | 71 | 23 |

It will be appreciated by those skilled in the art that these results may have a probable error of a few percent due to the limitations of testing. It is clear from the data that the addition of polymer in association with the enzyme tends to stabilize the bio-catalytic activity of the enzyme even at such extreme temperatures as 60°C.

EXAMPLE IV

The enzyme glucose oxidase used in Example I was prepared in a stock solution having a final concentration of enzyme of 0.02 milligrams per cubic centimeter.

A high molecular weight polyacrylamide polymer was admixed with deionized water at room temperature so that the final concentration of polymer was about one gram per 100 cubic centimeters.

The enzyme stock solution and the polymer solution were combined at the rate of one part enzyme solution to 10 parts polymer solution and mixed well. Five milliliters of this solution were each put into separate tubes for heat aging and testing. For comparative purposes, the enzyme solution alone was also made into samples for heat aging and testing. The samples which were not to be used immediately were stored in the refrigerator at 4°C.

The various samples with the appropriate controls were heated at 45°C., 50°C., and 60°C. for periods of one-fourth hour, one-half hour, 1 hour, 2 hours, and 4 hours. The samples were then tested for activity following the same procedure used in Example I and the results in terms of percentage activity remaining based upon the activity of the controls are tabled together below with the samples having no polymer recorded in parenthesis.

| Temp. Time | ¼ | ½ | 1 | 2 | 4 |
|---|---|---|---|---|---|
| 45°C | 95(94) | 94(90) | 88(79) | 82(68) | 78(59) |
| 50°C | 99(83) | 98(73) | 85(61) | 72(51) | 52(43) |
| 60°C | 41(36) | 23(19) | 11(9) | 8(3) | 6(0) |

EXAMPLE V

The enzyme glucose oxidase used in Example I was prepared by the process of Example IV following similar procedures for preparation, processing, and testing with the copolymer of polyvinyl alcohol and polyvinyl acetate used in Example III. The weight ratio of polymer to enzyme was varied from 5 to 1 to $5 \times 10^4$ to 1 in the various samples and sufficient samples were prepared so that before testing for activity, the various samples could be heat aged for 1 hour at 25°C., 45°C., 50°C., and 55°C. to determine the weight effect of the polymer. The results are shown below with the values reported as percent activity remaining.

|  | 25°C. | 45°C. | 50°C. | 55°C. |
| --- | --- | --- | --- | --- |
| $5 \times 10^0$ | 100 | 91 | 73 | 38 |
| $5 \times 10^1$ | 100 | 92 | 71 | 39 |
| $5 \times 10^2$ | 100 | 98 | 83 | 38 |
| $5 \times 10^3$ | 100 | 98 | 90 | 70 |
| $5 \times 10^4$ | 100 | 98 | 90 | 71 |

From the above data it can be seen that the weight ratio of polymer to enzyme is important only to the extent that at unusually high temperatures it is desirable in order to obtain the full beneficial effects of this invention it may be desirable to use higher ratios of polymer to enzyme. This is of little actual importance, however, since at operating temperatures of 25°C. which is 77°F., a temperature slightly higher than ambient clinical laboratory operating temperatures, and 45°C. which is 113°F., a temperature clearly outside reasonable ranges, weight ratio ranges are not of major significance to the purposes of the invention. It may be preferable, however, in order to obtain reasonable bio-catalytic stabilization to employ a weight ratio of polymer to enzyme of about $5 \times 10^3$ to 1.

It is clear from a full reading of this specification and its examples that modifications of these descriptions can be made within the scope of this invention. The scope of this invention is embodied in the appended claims.

What is claimed is:

1. A method of stabilizing the bio-catalytic activity of heat sensitive oxidoreductase enzymes comprising freeze drying the enzyme in the presence of a polymer selected from the group consisting of copolymers of polyvinyl pyrrolidone and polyvinyl acetate, and copolymers of polyvinyl alcohol and polyvinyl acetate.

2. The method according to claim 1 wherein the weight ratio of polymer to enzyme is from about 5 to 1 to about $5 \times 10^4$ to 1.

3. The method according to claim 1 wherein the weight ratio of polymer to enzyme is about $5 \times 10^3$ to 1.

4. The method according to claim 1 where the enzyme is glucose oxidase.

5. An enzymatically active, bio-catalytically stabilized aqueous composition comprising an oxidoreductase enzyme in intimate association with a polymer selected from the group consisting of copolymers of polyvinyl pyrrolidone and polyvinyl acetate, and copolymers of polyvinyl alcohol and polyvinyl acetate.

6. The composition of claim 5 wherein the enzyme is glucose oxidase.

7. The composition of claim 5 wherein the weight ratio of polymer to enzyme is from about 5 to 1 to about $5 \times 10^4$ to 1.

8. The composition of claim 5 wherein the weight ratio of polymer to enzyme is about $5 \times 10^3$ to 1.

* * * * *